(12) United States Patent
Miyahara et al.

(10) Patent No.: US 9,220,144 B2
(45) Date of Patent: Dec. 22, 2015

(54) HIGH-STABILITY DIMMER

(71) Applicant: ELM Inc., Kagoshima (JP)

(72) Inventors: Takakazu Miyahara, Kagoshima (JP);
Hiroshi Kirihara, Kagoshima (JP);
Mitsuhiro Hashiguchi, Kagoshima (JP)

(73) Assignee: ELM INC., Kagoshima (JP)

( * ) Notice: Subject to any disclaimer, the term of this patent is extended or adjusted under 35 U.S.C. 154(b) by 0 days.

(21) Appl. No.: 14/406,852

(22) PCT Filed: May 14, 2013

(86) PCT No.: PCT/JP2013/063373
§ 371 (c)(1),
(2) Date: Dec. 10, 2014

(87) PCT Pub. No.: WO2013/187166
PCT Pub. Date: Dec. 19, 2013

(65) Prior Publication Data

US 2015/0156842 A1 Jun. 4, 2015

(30) Foreign Application Priority Data

Jun. 11, 2012 (JP) ................................ 2012-132158

(51) Int. Cl.
*H05B 37/02* (2006.01)
*H05B 33/08* (2006.01)
(Continued)

(52) U.S. Cl.
CPC ........ *H05B 33/0845* (2013.01); *H05B 33/0815* (2013.01); *H05B 37/0281* (2013.01); *H02M 1/44* (2013.01); *H02M 5/293* (2013.01); *H05B 39/048* (2013.01); *Y02B 20/347* (2013.01)

(58) Field of Classification Search
CPC ......................... H05B 33/0815; H05B 33/0845
USPC ................................... 315/210, 294
See application file for complete search history.

(56) References Cited

U.S. PATENT DOCUMENTS

2011/0194311 A1*  8/2011  Gaknoki et al. ............ 363/21.12
2012/0146540 A1*  6/2012  Khayat et al. ................. 315/291
2013/0300301 A1* 11/2013  Miyahara et al. ............. 315/171

FOREIGN PATENT DOCUMENTS

CN    102934522    2/2012
JP    58-148663    2/1982
(Continued)

OTHER PUBLICATIONS

PCT Written Opinion of the International Searching Authority [PCT/ISA/237]; Aug. 27, 2013.
(Continued)

*Primary Examiner* — Don Le
(74) *Attorney, Agent, or Firm* — Frommer Lawrence & Haug LLP; William S. Frommer

(57) ABSTRACT

A time-division control circuit individually controls an effective voltage supplied to each lighting load by adjusting the periods during which switching circuits connected to N sets of lighting loads are kept on. A zero-cross signal having a value that changes at the zero-cross point of the AC voltage is generated. An oscillation signal is generated with a frequency equal to, or an integer multiple of the AC frequency. The phase difference between the zero-cross signal and the oscillation signal is measured and a common reference point that defines the timing for turning the switching circuits ON or OFF is determined on the basis of the measured phase difference. An ON/OFF signal for each switching circuit is transmitted at a timing for each of the N sets of switching circuits on the basis of the reference point and the effective voltage to be supplied to the lighting load.

11 Claims, 10 Drawing Sheets

(51) Int. Cl.
  *H05B 39/04* (2006.01)
  *H02M 1/44* (2007.01)
  *H02M 5/293* (2006.01)

(56) References Cited

FOREIGN PATENT DOCUMENTS

| JP | 59-060886 | 4/1984 |
| JP | 59-060891 | 4/1984 |
| JP | 59-060999 | 4/1984 |
| JP | 03-002342 | 1/1991 |
| JP | 11-032485 | 2/1999 |
| JP | 5070587 | 8/2012 |
| WO | WO 2012/081350 | 6/2012 |

OTHER PUBLICATIONS

International Search Reportissued in corresponding International Application No. PCT/JP2014/073322, mailed Aug. 27, 2013.

\* cited by examiner

Fig. 2
(a)
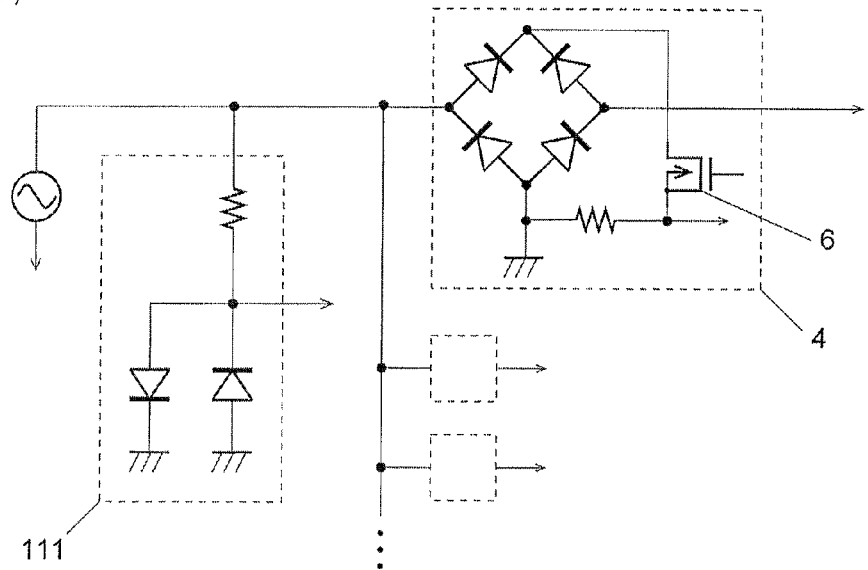
(b)
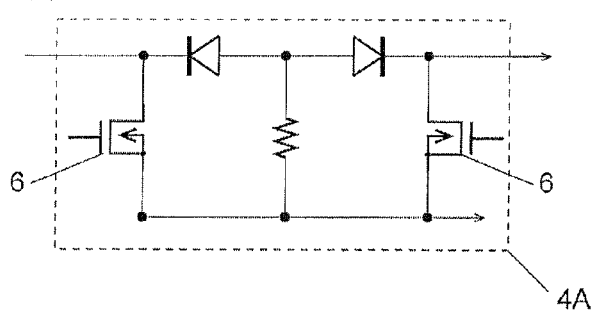
(c)
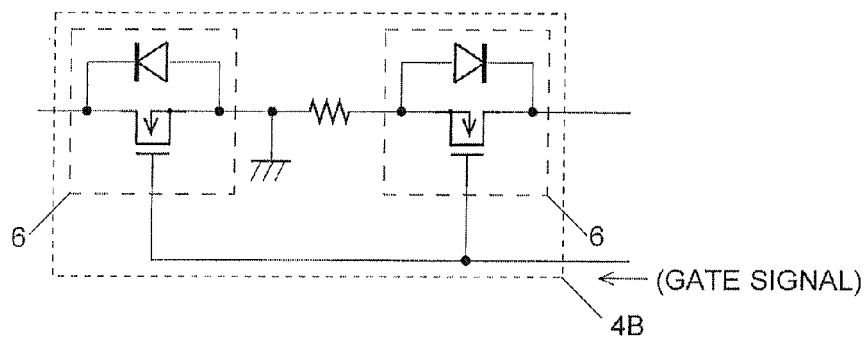

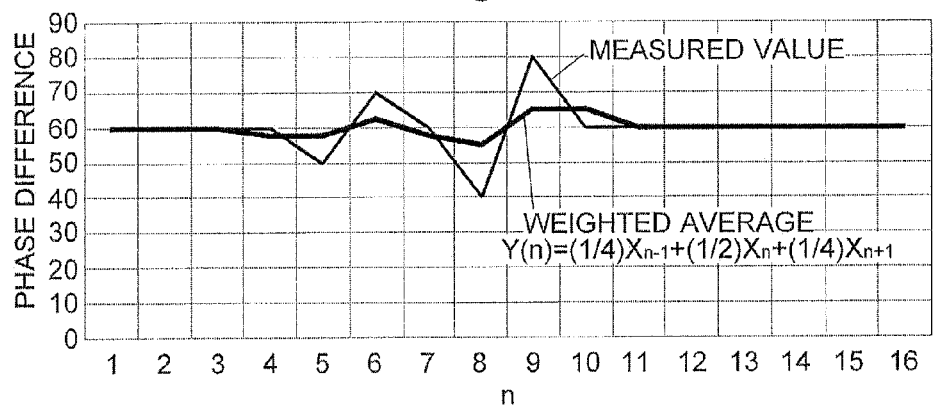
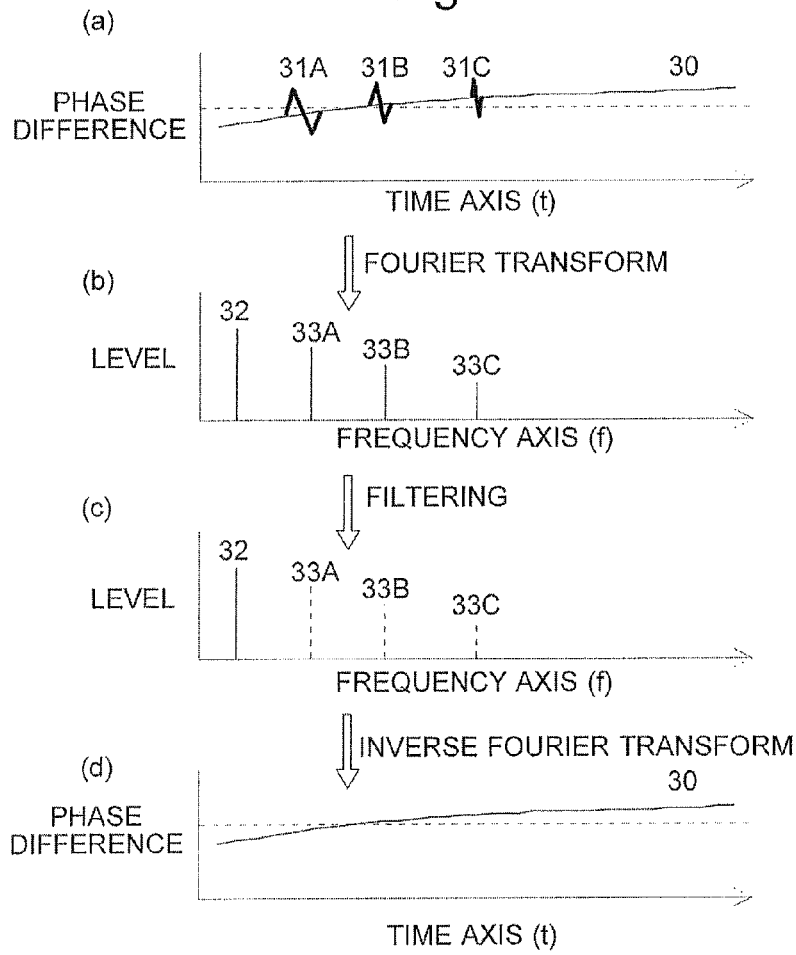

HIGH-STABILITY DIMMER

TECHNICAL FIELD

The present invention relates to a dimmer for controlling the intensity of light generated by a light source, such as a light emitting diode (LED), and more specifically, to a dimmer for controlling, for each of a plurality of light sources, the intensity of light generated by the light source.

BACKGROUND ART

As a means for controlling the output (brightness or luminous flux) of a light source by using an alternating current (AC) power source, a phase control system including a semiconductor switching element has been commonly used. Generally, in the phase control system, the switching element is serially connected between the AC power source and the light source (lighting load). The dimming of the light source is performed by controlling the conduction angle within one cycle of the AC voltage (this angle corresponds to the timing at which the switching element is turned on) so as to vary the effective voltage supplied from the AC power source to the lighting load. The "effective voltage" is the square root of the time average of the square of the AC voltage over one cycle. In the case where the AC voltage sinusoidally changes, the effective voltage is equal to $2^{-0.5}$ times the maximum value $V_0$ of the AC voltage if no on/off switching task is performed (i.e. if the switch is always on), and its value becomes smaller than $2^{-0.5} V_0$ if the on/off switching task is performed.

In one type of conventional dimmer using the phase control system, a zero-crossing point (the point in time at which the AC voltage becomes zero) is used as the reference point for controlling the conduction angle. This type of dimmer includes a zero-crossing detector for detecting the zero-crossing point.

However, the zero-crossing detector may possibly malfunction due to noise contamination or waveform distortion of the AC voltage supplied from the power source. In particular, if the AC voltage is supplied from a power generation by natural energy, such as wind power generation, solar power generation or other techniques which have been drawing attentions in recent years, the power is unstable and it is difficult to completely eliminate the noise or waveform distortion even if the power is controlled by the "smart grid", i.e. a power grid system having the function of autonomously controlling the electric power supply and demand by means of telecommunication devices and computers. Using an in-house power generation system is also more likely to cause noise contamination or waveform distortion than using the commercial power supply. In the case of a system including a plurality of light sources whose outputs (or brightnesses) need to be individually controlled, the switching circuit for one light source causes a noise or waveform distortion, which may possibly cause a malfunction of the switching element for another light source. Such noise or waveform distortion leads to a brightness fluctuation, flicker or similar problem occurring in the lighting apparatus. These problems are particularly noticeable in the case of an apparatus using an LED as the light source.

One method for more accurately detecting the zero-crossing point uses a phase lock loop (PLL) circuit (for example, see Patent Literature 1). In this system, the zero-crossing detector generates a pulse signal every time it detects the zero-crossing point. The PLL circuit, which includes an oscillator for generating an oscillating signal, receives the pulse signal and outputs the oscillating signal while performing a feedback control to synchronize the oscillating signal with the pulsed signal (i.e. to make these signals in phase with each other). Pulse signals originating from noise or other factors are out of phase with the oscillating signal and hence can be removed. However, the PLL circuit has the problem that, if the response speed is set at a low level, a considerable length of time will be needed to establish or restore the synchronization when the lighting apparatus is energized or the synchronization is broken for some reasons, during which time the amount of light of the apparatus will fluctuate. On the other hand, setting a higher response speed to avoid this problem will lead to an insufficient removal of the noise.

Patent Literature 2 discloses a dimmer in which a fast Fourier transform of the signal of the AC voltage before being sent to the zero-crossing detector is performed to extract only the fundamental component of the AC signal, and this signal, which is free from noise, is sent to the zero-crossing detector so that the zero-crossing point can be detected on the basis of the noise-free signal. However, this dimmer is expensive since it requires a high-performance computing unit to handle a large number of sampled data of the AC voltage signal during the fast Fourier transform operation.

CITATION LIST

Patent Literature

Patent Literature 1: JP 58-148663 A
Patent Literature 2: JP 11-032485 A

SUMMARY OF INVENTION

Technical Problem

The problem to be solved by the present invention is to provide a dimmer for controlling, for each of a plurality of light sources, the intensity of light generated by the light source, the dimmer being capable of preventing a malfunction due to the noise contamination or waveform distortion of the voltage supplied from an AC power source.

Solution to Problem

The dimmer according to the present invention aimed at solving the aforementioned problem is a dimmer for controlling an output of each of N sets of lighting loads (where N is an integer equal to or greater than two), including:

a) a total of N switching circuits, with one switching circuit serially connected between an alternating-current (AC) power source and each of the N sets of lighting loads; and b) a single time division control circuit for separately controlling each effective voltage supplied to each of the N sets of lighting loads, by regulating the period of time to turn on each of the N switching circuits, the time division control circuit including:

b-1) a single zero-crossing detector for detecting a zero-crossing point which is a point in time where the voltage of the AC power source becomes zero and for generating a zero-crossing signal whose value changes at the zero-crossing point;

b-2) a single oscillator for generating an oscillating signal having a frequency equal to the frequency of the AC power source or to an integral multiple of the frequency of the AC power source;

b-3) a single reference point determiner for measuring a phase difference between the zero-crossing signal and the oscillating signal every time the zero-crossing signal is generated, and for determining, based on data of measured values of the phase difference, a reference point to be used in setting the timing of turning on or off each switching circuit, the reference point being common to the N switching circuits; and b-4) a time division control signal generator provided for each of the N switching circuits, for transmitting, to the switching circuit, an on/off signal for turning on or off the switching circuit, at the timing determined based on the reference point and the effective voltage to be supplied to the lighting load.

The dimmer according to the present invention is designed to control, for each of the N sets of lighting loads, the intensity of light in the lighting load. One set of lighting load may consist of a single light source (e.g. LED) or a plurality of light sources. In any case, one lighting load is serially connected to one switching circuit. The switching circuit, which has one or more switching elements, turns on and off the power supplied to the lighting load connected to it.

A total of N sets of switching circuits and time division control signal generators are provided corresponding to the N sets of lighting loads. On the other hand, the zero-crossing detector, the oscillator and the reference point determiner are provided as a single set common to the N sets of lighting loads.

The value of the effective voltage individually supplied to each lighting load from the time division control signal generator is given from the outside of the time division control signal generator. The value of the effective voltage may be given by users, or there may be another apparatus (e.g. an automatic dimmer) to give this value. In the case where users should give this value, the dimmer may include a dimming level adjuster having an adjustment range between an upper limit and a lower limit for allowing users to set an emission intensity of each lighting load, and a dimming level setter for setting a set value of the effective voltage for each lighting load based on the emission intensity set through the dimming level adjuster.

In the dimmer according to the present invention, as explained earlier, the zero-crossing signal generated by the zero-crossing detector contains a signal that does not indicate the correct zero-crossing point due to noise, waveform distortion or the like caused by the power source or the switching circuits. On the other hand, the oscillating signal generated in the oscillator has a frequency equal to the frequency of the AC power source or an integral multiple of the frequency of the AC power source. This oscillating signal is always generated at a point in time that corresponds to the correct (or proper) zero-crossing point of the AC power source, although its point of generation (i.e. phase) is different from the zero-crossing point of the frequency of the power source. The reference point determiner measures this phase difference and determines a reference point based on the data of the phase difference every time the zero-crossing signal is generated. The reference point is a point which corresponds to the correct zero-crossing point of the AC power source and which is commonly applied in all the switching circuits. As will be described later, various kinds of statistical methods are available for the determination of this reference point.

By determining the reference point in this manner, the dimmer according to the present invention prevents the reference point from being incorrect due to the shift of the zero-crossing point resulting from noise contamination or waveform distortion of the voltage of the AC power source. Based on this reference point, the time division control signal generator can correctly determine the timing of turning on or off each switching circuit. Turning the switching circuits on and off with a correct timing in this manner prevents the brightness fluctuation or flicker of each lighting load.

In the dimmer according to the present invention, the use of the phase difference between the zero-crossing signal and the oscillating signal allows the oscillator to generate the oscillating signal with a phase unrelated to that of the zero-crossing signal. Unlike the device using a PLL circuit, it is unnecessary to control the oscillating signal so as to make it in phase with the zero-crossing signal. Therefore, the dimmer according to the present invention can be higher in response speed than the device using a PLL circuit.

The data to be used in the signal processing, i.e. the phase difference between the zero-crossing signal and the oscillating signal, is obtained every half cycle of the AC voltage. Such a small amount of data can be handled by an inexpensive computing unit, since it is unnecessary to handle a large number of sampled data as in the conventional system which performs a fast Fourier transform of the AC voltage signal.

The frequency of the oscillating signal may be a value that is predetermined according to the frequency of the AC power source. Alternatively, it is also possible to provide a frequency setter for measuring the frequency of the AC power source or the frequency of the zero-crossing signal and for setting the frequency of the oscillating signal in the oscillator based on the measured frequency. This design makes the dimmer independent of the difference in the frequency of the AC power sources used in different countries, regions and so on.

One example of the statistical method for determining the reference point in the reference point determiner is hereinafter described. In the reference point determiner of this example, every time a zero-crossing point determined from the zero-crossing signal (this zero-crossing detection does not always coincide with the true zero-crossing point in the AC power source due to the noise contamination or other factors) is detected, an average of the phase differences of a plurality of previous zero-crossing points over a predetermined period of time up to the detection time is calculated, and a point in time earlier (if the phase of the zero-crossing signal precedes that of the oscillating signal) or later (if the phase of the zero-crossing signal succeeds that of the oscillating signal) than the point in time as the reference of the phase of the oscillating signal (e.g. the point in time when the oscillating signal changes from positive to negative or vice versa) by the average of the phase difference is chosen as the reference point. Under ideal conditions, i.e. when there is no influence from noise or the like, this reference point coincides with the zero-crossing point. Even if a wrong zero-crossing point (displaced from the true reference point) is included within the aforementioned predetermined period of time, an approximately correct phase difference, and hence an appropriately correct reference point, can be obtained by averaging the phase differences. In the average calculation, the largest and smallest values of the phase differences at the aforementioned plurality of zero-crossing points may be excluded, leaving the other values to be used to calculate the average. Weighting the phase differences according to a predetermined condition so as to vary the degree of contribution of each of the zero-crossing points is also possible.

Alternatively, the reference point may be determined by the fast Fourier transform of a differential signal indicating the difference between the zero-crossing signal and the oscillating signal. This fast Fourier transform uses only one differential signal for every half cycle of the AC voltage. Therefore, it is unnecessary to handle a large number of sampled data as in the system performing the fast Fourier transform in the conventional manner.

In the dimmer according to the present invention, the reference point may be directly used as the timing of turning on and off the switching element. Alternatively, a point in time displaced from the reference point by a predetermined length of time may be used as the timing of turning on and off the element. In a particularly preferable mode of the present invention, a point in time that is a predetermined length of time earlier than a point in time that is out of phase with the zero-crossing point by $\pi/2$ (i.e. a point in time where the voltage of the AC power source peaks) is chosen as the timing of turning on, while a point in time that is the same length of time later than the point in time that is out of phase with the zero-crossing point by $\pi/2$ is chosen as the timing of turning off. Such a timing control reduces the phase difference between the AC voltage and the alternating current and prevents the decrease in the power factor during the dimming operation.

The reference point determiner and the time division control signal generator can be realized by using a software program and a central processing unit (CPU). In the case of using the frequency setter, the functions of measuring the frequency and setting the frequency of the oscillating signal may also be realized by using a software program and a CPU. The oscillator can be realized by using the external clock function of the CPU. For the dimming level adjuster, either a hardware device (e.g. a variable resistor) or a computer (software) can be used.

In a preferable mode of the dimmer according to the present invention:

the dimming level setter is configured to set a minimum effective voltage at which the lighting load begins to emit light as a light-activating effective voltage, to relate the light-activating effective voltage to a predetermined light-activating position within the adjustment range of the dimming level adjuster, and to assign, between the light-activating position and a position corresponding to a highest level of the effective voltage supplied to the lighting load within the adjustment range, values of the effective voltage between the light-activating effective voltage and the highest level of the effective voltage.

By this system, the range of the effective voltage where the lighting load does not become activated (including the range of the effective voltage where the activated light is too faint to be recognized by users) will not be broadly assigned within the adjustment range of the dimming level adjuster. Accordingly, users can manipulate the dimming level adjuster with a natural feel of operation.

Advantageous Effects of the Invention

By the present invention, malfunctions of the dimmer due to the noise contamination and/or waveform distortion which occurs in the AC power source and/or the switching circuits are prevented by calculating the timing of turning on and off the switching circuits using a reference point determined on the basis of measured data of the phase difference between the zero-crossing signal and the oscillating signal. Unlike the system using a PLL circuit, the response speed will not present any problem. The signal processing is easier than in the case of removing noise or the like from the voltage signal of the AC power source. The present invention is particularly effective in the case of using a power supply susceptible to noise contamination or waveform distortion, such as a natural-energy power generation (e.g. wind power generation or solar power generation) or in-house power gendation, both of which are expected to be more widely used in the future.

The dimmer according to the present invention also has the advantage that it can be simpler in configuration and smaller in size, since the present invention allows one dimming level setter and one time division control circuit to be shared by a plurality of lighting loads.

BRIEF DESCRIPTION OF DRAWINGS

FIG. 2 shows circuit diagrams of the zero-crossing detector section 111 and the switching circuit 4.

FIG. 8 is a graph showing one example of the statistical processing by an FIR filter.

FIG. 9 is a conceptual diagram showing an operation of an FFT filter.

DESCRIPTION OF EMBODIMENTS

One embodiment of the dimmer according to the present invention will be hereinafter described by means of FIGS. 1-14.

(1) Configuration of Dimmer 1 of Present Embodiment

Figure 1:
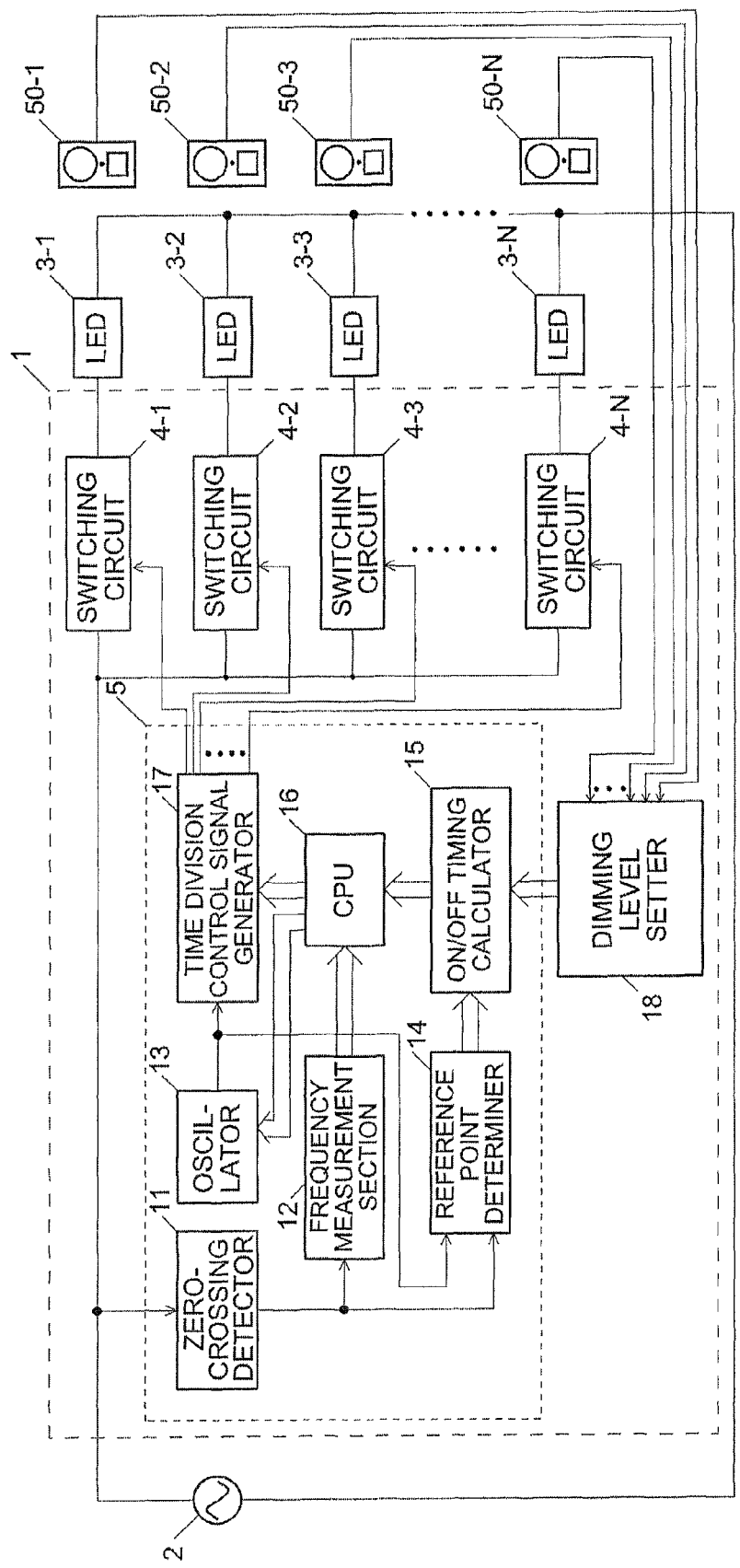
FIG. 1 is a block diagram showing a lighting circuit including a dimmer according to one embodiment of the present invention.

The dimmer 1 of the present embodiment is used in a lighting circuit shown in FIG. 1. In this lighting circuit, N sets of lighting loads (e.g. LEDs) are connected in parallel to an AC power source 2. In the following descriptions, the individual lighting loads are respectively denoted by reference signs 3-1, 3-1, . . . and 3-N, and when the description generally applies to all the lighting loads, they will be collectively denoted by reference sign "3." Each of the lighting loads 3-1, 3-2, . . . and 3-N may consist of a single lighting load or a combination of two or more lighting loads. The dimmer 1 consists of switching circuits 4-1, 4-2, . . . and 4-N as well as a time division control circuit 5, where each of the switching circuits is serially connected between the AC power source 2 and the corresponding lighting load 3-1, 3-2, . . . or 3-N. The present lighting circuit is also provided with dimming level adjusters 50-1, 50-2, . . . and 50-N corresponding to the lighting loads 3-1, 3-2, . . . and 3-N, respectively. In the following descriptions, the switching circuits and the dimming level adjusters will be respectively denoted by reference signs "4" and "50" when the description generally applies to all of those elements. For the dimming level adjusters 50, either a hardware device (e.g. a dial using a variable resistor) or a computer (software) can be used.

A generally used type of switching circuit 4 includes a rectifier circuit using a diode bridge, which consists of four diodes, and a switching element 6 provided in this circuit (FIG. 2(*a*)). A field-effect transistor (FET) can be used as the switching element 6. Alternatively, as shown in FIG. 2(*b*), a switching circuit 4A having two switching elements (FETs) and two diodes may also be used. This switching circuit 4A is advantageous for suppressing the loss of power because it has only one diode through which an electric current passes whereas the switching circuit 4 has two such diodes. In place of the diodes used in the switching circuit 4A, the built-in diodes (body diodes) of the FETs which function as switching elements may be used (as in the switching circuit 4B shown in FIG. 2(*c*)). This configuration requires no external diode and makes the switching circuit simpler. This example is also advantageous for simplifying the control circuit since the two FETs can be controlled by one gate signal. As still another example, a triac (bidirectional thyristor) may be used. In this case, the switching circuit 4 can be created using only one triac.

The time division control circuit 5 has a zero-crossing detector section 11, a frequency measurement section 12, an oscillator 13, a reference point determiner section 14, an on/off timing calculator section 15, a CPU 16, and a time division control signal generator section 17. These components of the time division control circuit 5 will be hereinafter described in detail.

The zero-crossing detector section 11 receives a signal of the voltage of the AC power source 2 (which is hereinafter called the "source voltage"), generates a zero-crossing signal based on the received signal, and outputs the generated signal. The zero-crossing detector section 11 in the present embodiment detects the zero-crossing point of the signal of the source voltage by the zero-crossing detector circuit 111 shown in FIG. 2(*a*). In the zero-crossing detector circuit 111, two diodes are parallel-connected, via a resistor, to a point between the AC power source 2 and the switching circuit 4, with their polarities being oppositely directed to each other. Diodes have the characteristic that, after the voltage between the anode and the cathode has exceeded a predetermined level (activating voltage), the current passing the diode can be increased without causing any noticeable increase in the voltage. Therefore, when the effective value of the source voltage is sufficiently higher than the activating voltage, the periodical change of the source voltage applied across the zero-crossing detector circuit 111 causes no change in the absolute value of the voltage applied between the ends of the diode; it merely changes the polarity of the latter voltage at each zero-crossing point. Based on this voltage between the ends of the diode, a zero-crossing signal with binary values ($\pm V_c$) can be obtained.

The frequency measurement section 12 measures the frequency of the zero-crossing signal. The oscillator 13 generates an oscillating signal having a frequency equal to the frequency of the zero-crossing signal measured by the frequency measurement section 12 or to an integral multiple of the measured frequency. The reference point determiner section 14 receives the zero-crossing signal and the oscillating signal, calculates the phase difference between them, and defines a reference point for determining the timing of turning on or off the switching element 6 in such a manner as will be described later, based on the phase-difference data, or more specifically, based on the temporal change in the phase difference.

The zero-crossing detector section 11, the frequency measurement section 12, the oscillator 13 and the reference point determiner section 14 described thus far are provided as a single set common to the N sets of lighting loads 3-1, 3-2, . . . and 3-N.

The on/off timing calculator section 15 calculates the timing of turning on or off each of the switching elements 6-1, 6-2, . . . and 6-N (the previously described switching elements 6; see FIGS. 2(*a*)-(*c*)) in the switching circuit 4-1, 4-2, . . . 4-N, based on the reference point determined by the reference point determiner section 14. The on/off timing calculator section 15 may be provided for each of the lighting loads 3-1, 3-2, . . . and 3-N. However, in the present embodiment, the single on/off timing calculator 15 performs the task of calculating the on/off timing for every lighting load, using the CPU 16 as will be described later. The time division control signal generator section 17 transmits an on/off signal for turning on or off the switching element to each of the switching elements 6-1, 6-2, . . . and 6-N. The transmitter for sending the on/off signal is provided for each of the lighting loads 3-1, 3-2, . . . and 3-N. The combination of the on/off timing calculator section 15 and the time division control signal generator section 17 corresponds to the aforementioned time division control signal generator.

The dimming level setter section 18 sets the values (dimming levels) of the effective voltages to be supplied to the lighting loads 3-1, 3-2, . . . and 3-N, based on the brightness levels which are set through the dimming level adjusters 50-1, 50-2, . . . and 50-N for the corresponding lighting loads. The dimming levels set by the dimming level setter section 18 are sent to the on/off timing calculator section 15. The on/off timing calculator section 15 calculates the on/off timing so that the ON period of the switching element 6 will be longer for a lighting apparatus which has been set to increase its brightness.

The CPU 16 controls the previously described components, i.e. the frequency measurement section 12, the oscillator 13, the reference point determiner section 14, the on/off timing calculator section 15, the time division control signal generator section 17 and the dimming level setter section 18. The reference point determiner section 14, the on/off timing calculator section 15 and the time division control signal generator section 17 are actually realized by the CPU 16. The CPU 16 also has the functions of determining the oscillation frequency of the oscillating signal based on the frequency measured by the frequency measurement section 12 and instructing the oscillator 13 of that frequency. That is to say, the combination of the frequency measurement section 12 and the CPU 16 functions as the aforementioned frequency setter.

(2) Operation of Dimmer 1 of Present Embodiment

Figure 3:
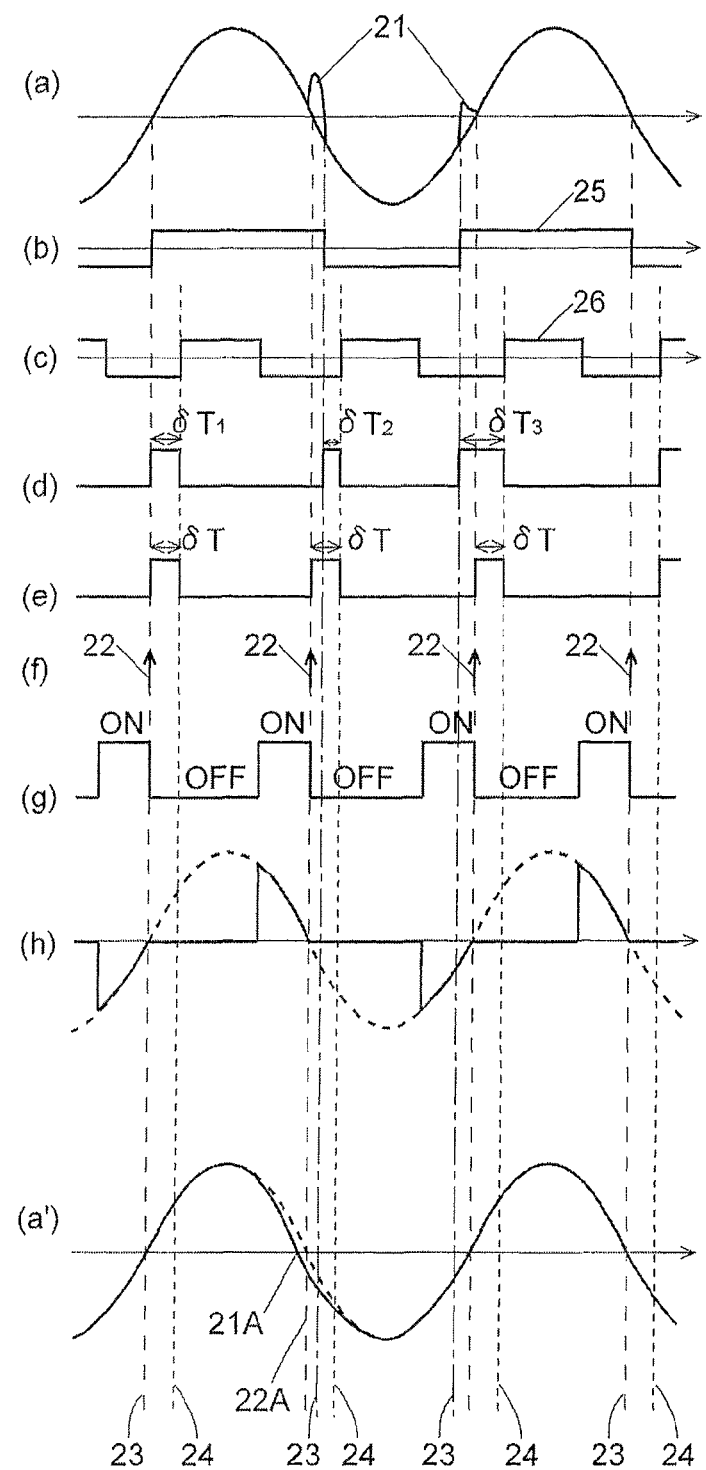
FIG. 3 is a waveform chart for illustrating an operation of the dimmer of the present embodiment.
Figure 4:
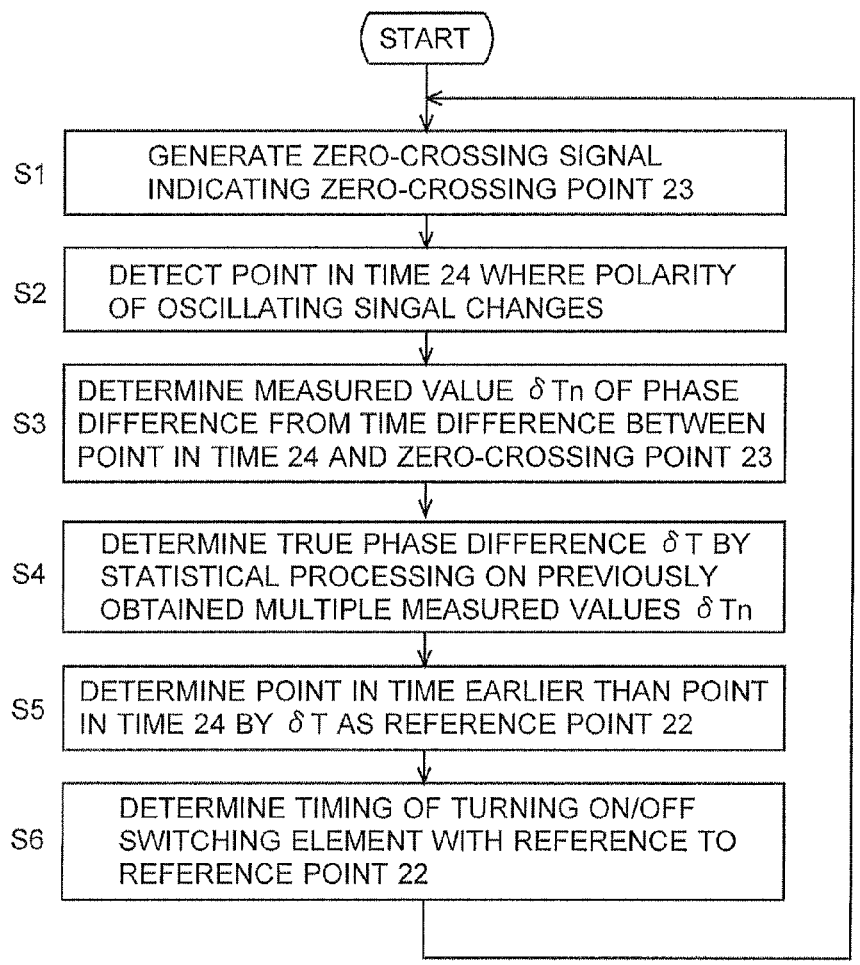
FIG. 4 is a flowchart showing the operation of the dimmer of the present embodiment.

An operation of the dimmer 1 of the present embodiment is hereinafter described by means of the explanatory diagrams of FIGS. 3(*a*)-3(*h*) and 3(*a'*) as well as the flowchart of FIG. 4. To remove the influence of noise and other factors superimposed on the source voltage, the dimmer 1 repeatedly performs the following operations of Steps S1 through S6: The zero-crossing detector section 11 generates a zero-crossing signal 25 which indicates that the point in time where the absolute value of the source voltage has been found to be equal to or less than a predetermined threshold is a zero-crossing point 23 (Step S1 and FIG. 3(*b*)). In the present embodiment, since the previously described zero-crossing detector circuit 111 is used, the zero-crossing signal 25 is in the form of rectangular waves having a value of $+V_c$ when the source voltage is positive and $-V_c$ when negative. The source voltage may have noises 21 superimposed on it (FIG. 3(*a*)), or its AC waveform may be distorted (FIG. 3(*a'*)). The noise contamination or AC waveform distortion is particularly likely to occur in an electric power created by a natural-energy power generation or in-house generation since the output power of these systems is low and unstable. If such a noise-contaminated signal of the source voltage is fed to the zero-crossing detector section 11, and if the noise 21 is located near the point in time that should inherently be a zero-crossing point (if no noise is present), then the source voltage with the noise 21 superimposed changes from positive to negative, or vice versa, at a point in time 23 that is not the correct zero-crossing point, causing the zero-crossing detector section 11 to mistake this point for the zero-crossing point 23 and generate the zero-crossing signal 25 (FIG. 3(*b*)). Similarly, when the waveform of the source voltage is distorted, the zero-crossing signal 25 is generated at a point in time (reference sign 21A) shifted from the point in time (reference sign 22A) at which the zero-crossing signal should be generated when there is no waveform distortion. Although the following descriptions will be focused on the case of noise contamination, the same processing is applicable to the case of waveform distortion.

Meanwhile, the frequency measurement section 12 measures the zero-crossing signal 25 over multiple cycles. Therefore, it can determine the correct frequency of the source voltage by statistical calculation, such as averaging. Based on the determined correct frequency of the source voltage, the oscillator 13 generates an oscillating signal 26 (FIG. 3(*c*)). In the present embodiment, the oscillating signal 26 is in the form of rectangular waves taking the values of $\pm V_0$, with a frequency equal to two times that of the source voltage. It should be noted that the frequency of the oscillating signal 26 may be equal to the frequency of the source voltage or three or more times as high as the latter frequency. The oscillating signal 26 does not need to be in phase with that of the source voltage or zero-crossing signal 25; the oscillating signal 26 is generated independent of them.

Every time the polarity of the zero-crossing signal 25 changes from positive to negative, or vice versa, the reference point determiner section 14 calculates the point in time 24 where the polarity of the oscillating signal 26 changes (Step S2). From the difference between the points in time of the polarity change of the two signals, the reference point determiner section 14 determines the measured value δTn of the phase difference between the zero-crossing signal 25 and the oscillating signal 26 (Step S3 and FIG. 3(*d*)). This measured value δTn of the phase difference varies in magnitude for each cycle due to the influence of the noise 21. Using a predetermined number of measured values of the phase difference that have been obtained until that point in time, the reference point determiner section 14 performs a statistical processing, which will be described later in the section "(3) Statistical Processing in Reference Point Determiner Section 14", to obtain the true phase difference δT (Step S4). Then, it determines, as the reference point 22, a point in time that is earlier by the true phase difference δT than the point in time 24 where the polarity of the oscillating signal 26 changes (Step S5, FIGS. 3(*e*) and (*f*)). The operations described thus far are performed independently of the individual setting of the lighting loads 3-1, 3-2, . . . and 3-N.

Subsequently, based on the reference point 22 determined by the reference point determiner 14, the on/off timing calculator section 15 determines the timing of turning on or off the switching elements 6-1, 6-2, . . . and 6-N for each lighting load 3-1, 3-2, . . . or 3-N as follows (Step S6). In the present embodiment, each half cycle (i.e. each period where the voltage is either positive or negative) of the source voltage is defined as one unitary period of time in which the OFF period is from the reference point 22 to a predetermined point in time and the ON period is from this predetermined point in time to the next reference point 22 (Step 3(*g*)). The aforementioned predetermined point in time is determined on the basis of the effective voltage to be supplied to the lighting load 3, and this voltage is determined by the set value of the dimming level setter section 18. Based on the thus determined on/off timing, the time division control signal generator section 17 transmits, to the switching elements 6-1, 6-2, . . . and 6-N, the time division signals which have been respectively determined for the lighting loads 3-1, 3-2, . . . and 3-N. Subsequently, the operations of Steps S1 through S6 are repeated. Thus, the effective voltages supplied to the respective lighting loads 3-1, 3-2, . . . and 3-N are controlled (FIG. 3(*h*)), whereby the output (or brightness) control of the lighting loads 3-1, 3-2, . . . and 3-N is realized.

In the dimmer 1 of the present embodiment, it is unnecessary to synchronize the phase of the oscillating signal with that of the source voltage or the zero-crossing signal. Therefore, the response speed can be set higher than in the case of using a PLL circuit. Since the number of sampled data to be handled is smaller than in the case of the conventional system which performs a fast Fourier transform on the signal of the AC voltage, it is unnecessary to use a high-performance CPU. This is advantageous for cost reduction.

(3) Statistical Processing in Reference Point Determiner Section 14

Figure 5:
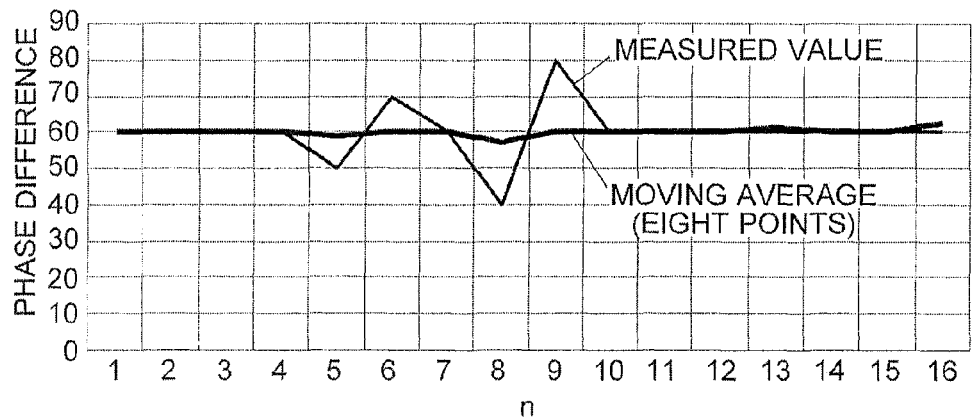
FIG. 5 is a graph showing one example of the statistical processing by the moving-average method.
Figure 6:
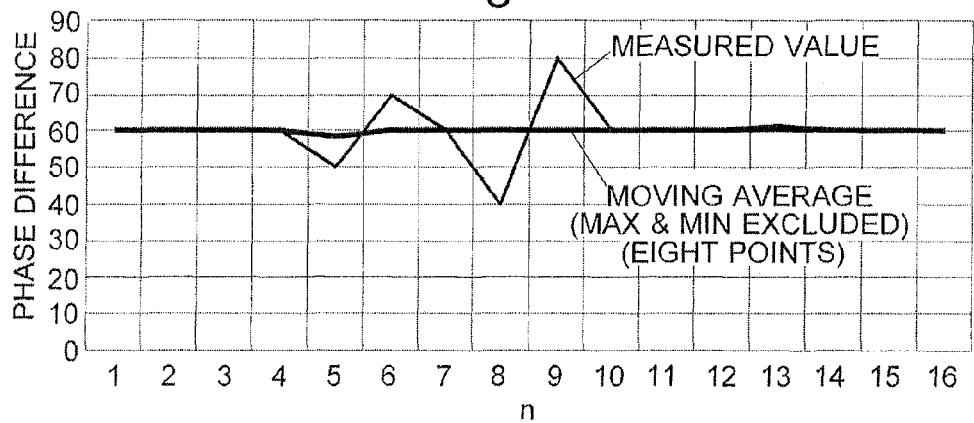
FIG. 6 is a graph showing a modified version of the statistical processing by the moving-average method.

One example of the statistical processing performed in the reference point determiner section 14 is hereinafter described by means of FIGS. 5-8. The following description deals with the case where the measured value δn (n is an integer) of the phase difference shown in FIG. 3(*d*) has changed with time (with an increase of n) as shown in FIG. 5. It should be noted that the measured values of the phase difference shown in FIGS. 6 and 8 are the same as those shown in FIG. 5.

(3-1) Statistical Processing by Moving-Average Method

The first example uses a moving-average method. According to this method, every time a measured value δn is obtained, a predetermined number of the latest measured values including δn are averaged. FIG. 5 shows an example of averaging eight measured values. The measured values are distributed over a range of ±20°. By contrast, the values obtained by the moving-average method are confined within a range of ±2.5°. This error range of δn is sufficiently smaller than that of the measured values.

(3-2) Modified Version of Moving-Average Method

In the second example, which is also a moving-average method, every time a measured value δn is obtained, an average is calculated for a set of measured values that remains after the largest and smallest values are excluded from a predetermined number (equal to or greater than four) of the latest measured values including δn. The largest and smallest values are likely to originate from noise. Excluding these values from the average calculation improves the noise removal effect. FIG. 6 shows an example of averaging eight measured values which remained after the largest and smallest values were excluded from ten measured values. The graph demonstrates that the variation of the average value has reduced even more than in the case of FIG. 5.

(3-3) Finite Impulse Response (FIR) Filter

Figure 7:
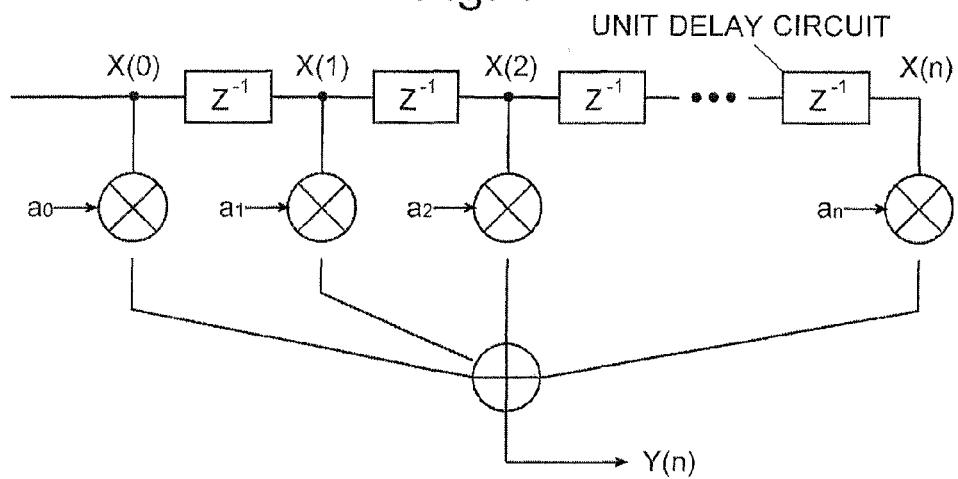
FIG. 7 is a block diagram of an FIR filter.

The third example is a system using an FIR filter, which is a representative digital filter. FIG. 7 is a block diagram of the FIR filter used in the present embodiment. At each point in time, this FIR filter receives a measured value as $X(n)=X(0)$. Every time a new measured value is obtained, the serial number n of each of the previously obtained measured values is incremented by one, such as $X(1)$, $X(2)$, and so on. The measured values $X(n)=X(0)$, $X(1)$, $X(2)$, . . . thus obtained at the respective points in time are respectively multiplied by coefficients $a_n=a_0, a_1, a_2, \ldots$ which are determined for each value of n (where the sum of $a_0, a_1, a_2, \ldots$ is one), and the sum of the weighted values, i.e. $Y(n)=a_0X(0)+a_1X(1)+a_2X(2)+ \ldots +a_nX(n)$, is outputted as the average value. The value of the weighting coefficient $a_n$ may be changed for each value of n, for example, in such a manner that $a_n$ becomes larger as the elapsed time from the measurement of $X(n)$ is shorter.

As one specific example, FIG. 8 shows the result of a calculation of an output value of the phase difference in which three latest measured values δn of the phase difference were averaged, with the second value (n=1) weighted by coefficient $a_1=½$, while the first and third coefficients being $a_0=¼$ and $a_2=¼$; that is, $Y=(¼)X(0)+(½)X(1)+(¼)X(2)$. Since the number of sampled phase-difference values is three, the variation of the output value in the present example is somewhat larger than those of the first and second examples. However, the variation in the output value of the FIR system can also be reduced by increasing the number of sampled data.

(3-4) FFT Filter

The fourth example is a system using an FFT filter. FIG. 9 is a conceptual diagram showing an operation of an FFT filter. A change in the measured value δn of the phase difference between the zero-crossing signal and the oscillating signal determined in the reference point determiner section 14 (FIG. 3(d)) can be represented by a graph with the horizontal axis indicating time, as shown in FIG. 9(a). In this graph, if the zero-crossing signal is contaminated by noise, the observed signal will have error components 31A, 31B, 31C, . . . superimposed on the original signal 30, causing a sudden change in the measured value of the phase difference. In the fourth example, a Fourier transform is performed on the data of this graph. The result of this operation will be as shown in FIG. 9(b) by a graph with the horizontal axis indicating the frequency, in which one peak 32 corresponding to the true frequency of the zero-crossing signal is observed along with the peaks 33A, 33B, 33C, . . . originating from the errors. Next, the peaks 33A, 33B, 33C, . . . originating from the errors are removed from the data of the graph (filtering process; FIG. 9(c)). After these peaks are removed, an inverse Fourier transform is performed on the remaining data. As a result, a graph of the phase difference 8T free from noise, with the horizontal axis indicating time, is obtained (FIG. 9(d)).

Figure 10:
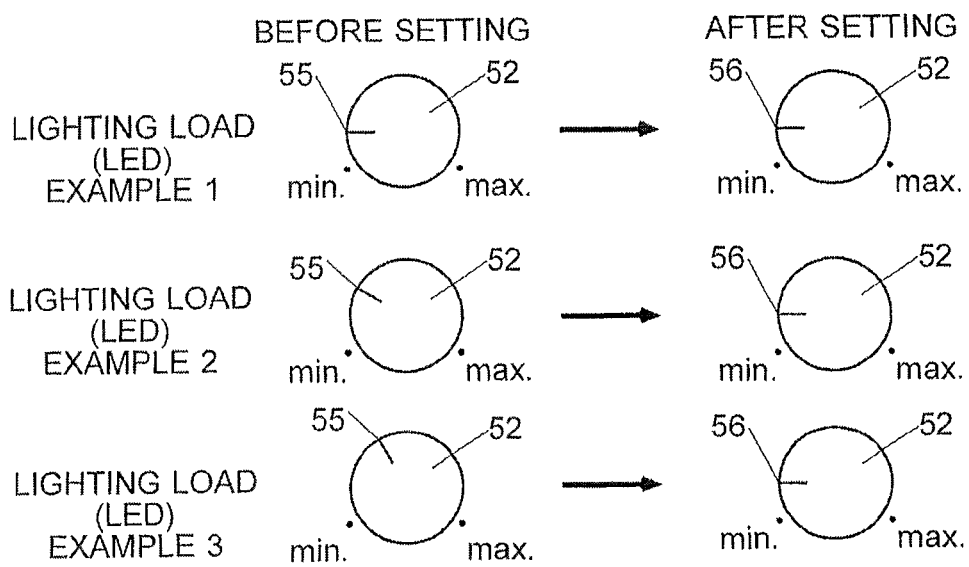
FIG. 10 is a diagram showing the light-activating positions of a dimming dial provided in the dimmer of the present embodiment before and after the setting of the relationship between the rotational angle of the dimming dial and the actual dimming level.
Figure 11:
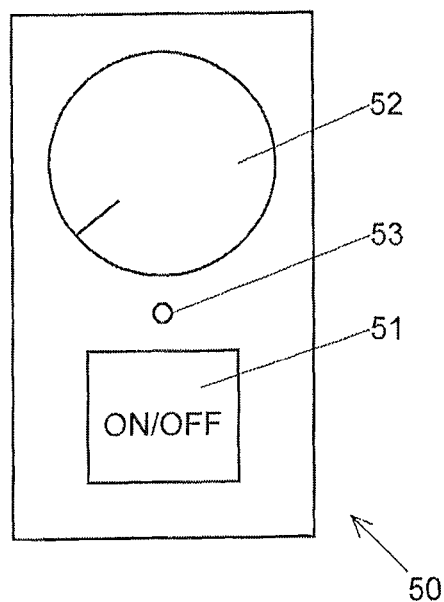
FIG. 11 is a plan view showing an ON/OFF switch, a dimming dial and an indicator provided in the dimmer of the present embodiment.
Figure 12:
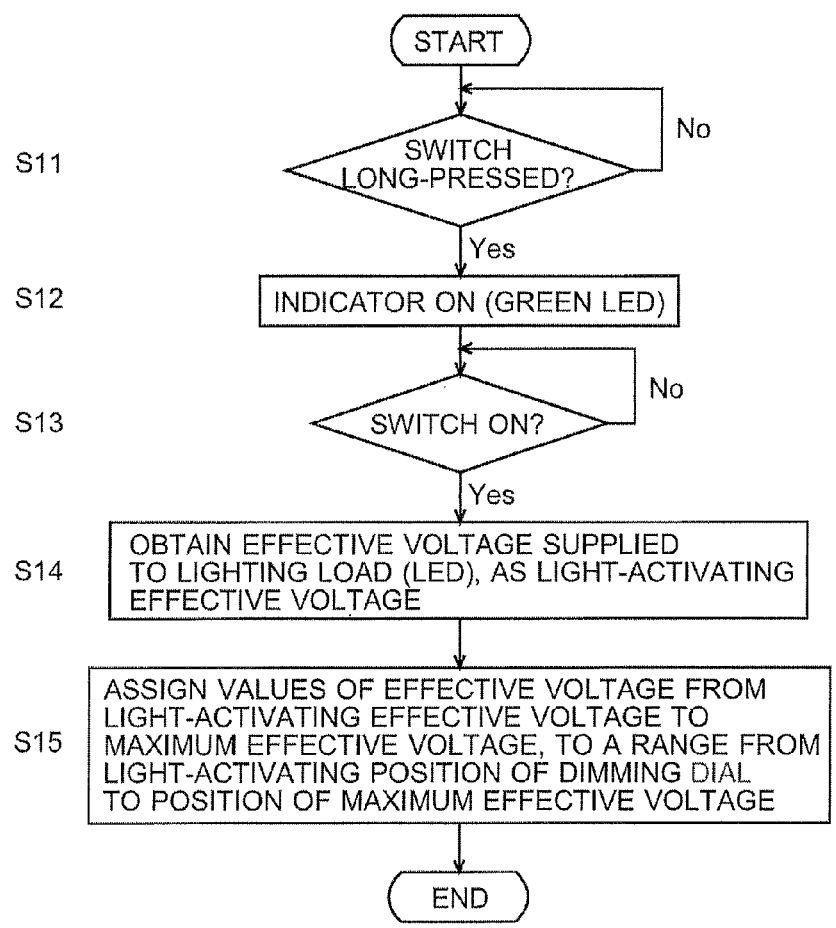
FIG. 12 is a flowchart showing an operation of setting of the relation of the rotational angle of the dimming dial and the actual dimming level.

(4) Setting Relationship between Rotational Angle of Dimming Dial and Actual Dimming Level A method for setting the relationship between the rotational angle of a dimming dial 52, which is included in each of the dimming level adjusters 50 of the present embodiment for user operation, and the actual dimming level is hereinafter described by means of FIGS. 10-12.

The reason why such a setting is necessary is as follows: In LEDs, when an effective voltage supplied to the load is increased from zero, the device remains inactive until the effective voltage reaches a certain threshold (which is hereinafter referred to as the light-activating effective voltage). If the effective voltages from the minimum (effective voltage=0) to the maximum levels are simply assigned over the range of movement (adjustment range) of the dimming dial 52, the LED will not become active until the dimming dial being rotated toward higher effective voltages reaches a rotational position 55 corresponding to the aforementioned threshold, making the user's dialing operation to that point useless (FIG. 10, left). Furthermore, since each LED element has a different light-activating effective voltage (FIG. 10, left), the feel of operation of the dimming dial changes depending on which LED element is connected. To address these problems, in the present embodiment, as will be described later, a predetermined position within the range of movement of the dimming dial is related to the light-activating effective voltage so as to prevent the range where the LED is inactive from occupying too wide a section within the range of movement of the dial, as well as to prevent the operability from being varied due to the use of different LED elements.

A specific method for setting the dimming level is as follows: As shown in FIG. 11, the dimming level adjuster 50 in the present invention has an ON/OFF switch 51 and a dimming dial 52 to be operated by users. The ON/OFF switch 51 is a push-button switch which is normally used for turning on and off the LED (lighting load 3). Pushing this switch cyclically changes the state of lighting; one push turns on the light, the next push turns it off, and so on. The dimming dial 52 is used for regulating the diming level. Rotating this dial clockwise makes the LED emit stronger light. To perform the operation of setting the relationship between the dimming dial 52 and the dimming level (e.g. when the LED has been replaced), the ON/OFF switch 51 is set to the ON position and the dimming dial 52 is set to the maximum value (i.e. the dial is fully turned clockwise). Subsequently, the ON/OFF switch 51 is continuously pressed for several seconds (five seconds in the present embodiment). This "long pressing" triggers the operation of setting the dimming level (Step S11 in FIG. 12). Then, the indicator 53 below the dimming dial 52 turns on (Step S12). The indicator 53 is a green LED with an output lower than that of the LED used as the lighting load 3. Its light informs the user that the device is in the dimming-level setting mode. In this mode, the user turns the dimming dial 52 counterclockwise, and when the LED (lighting load 3) has turned off, i.e. when the effective voltage supplied to the LED has been set to the lowest level for activating the LED, the user pushes the ON/OFF switch 51 (Step S13). In response to this operation, the dimming level setter section 18 obtains, as the value of the light-activating effective voltage, the effective voltage being supplied to the LED of the lighting load 3 at that moment (Step S14). Then, the dimming level setter section 18 assigns the values of the effective voltage from the light-activating effective voltage to the maximum effective voltage, to a rotational range from the light-activating position 56 (FIG. 10, right), which is the predetermined position within the range of movement of the dimming dial 52, to the position where the dial is fully turned clockwise, i.e. the position corresponding to the maximum effective voltage (Step S15). Thus, the setting of the dimming level is completed.

By setting the dimming level in the this manner, it is possible to make the LED (lighting load 3) begin to emit light at the same light-activating position 56 on all the dimming dials 52 even if the light-activating position before the setting is different.

The aforementioned setting can be cancelled by setting the dimming dial 52 to the minimum value (by fully turning it counterclockwise) and holding down ("long-pressing") the ON/OFF switch 51.

(5) Improvement of Power Factor by Adjusting Timing of Turning on/Off the Switching Circuit 4

Figure 13:
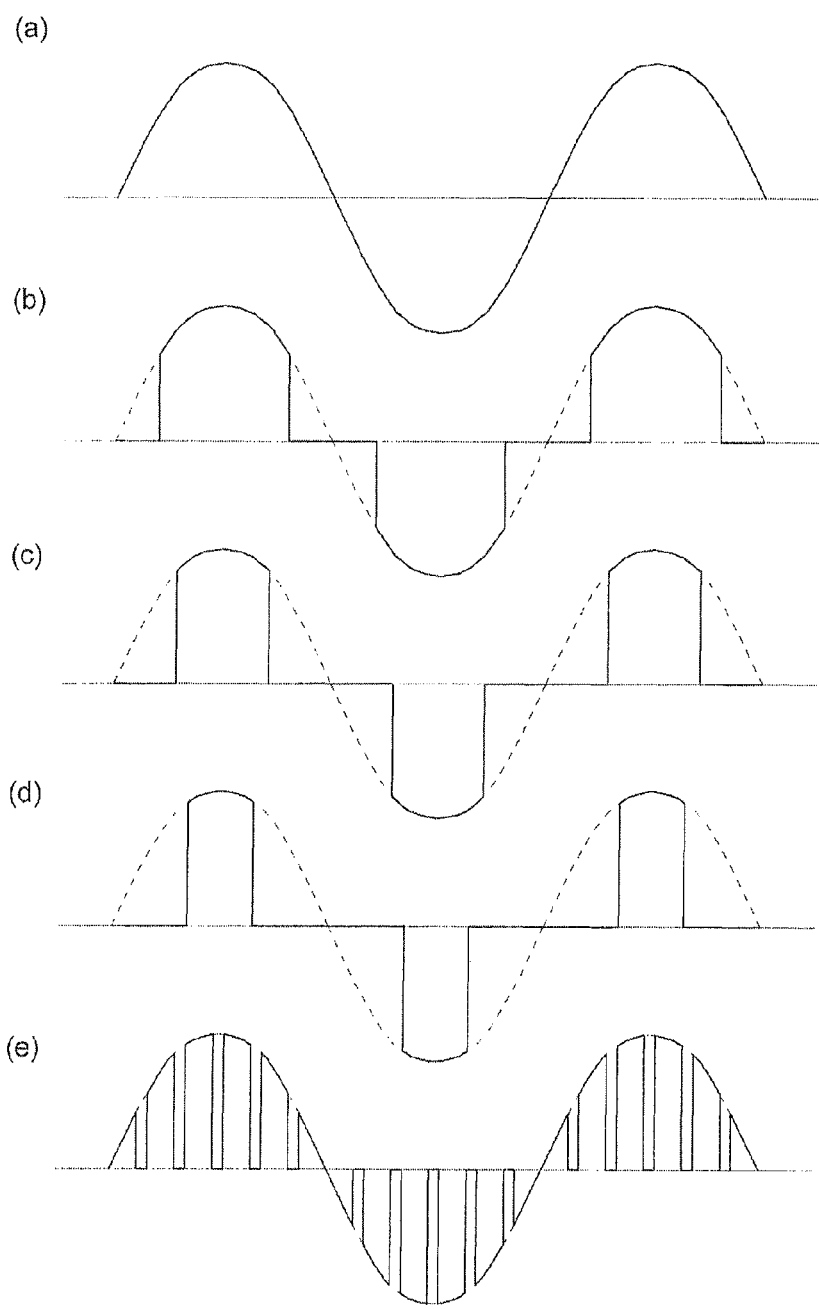
FIG. 13 shows graphs illustrating other examples of the timing of turning on/off the switching element 6.

Other than the example shown in FIG. 3(h) in which the switching circuit 4 is turned off (or on) at the zero-crossing points, the timing of switching on/off the circuit may be determined so that the ON (or OFF) periods appear in such a manner that the voltage waveform becomes symmetrical with respect to the point in time that is out of phase with the zero-crossing point by $\pi/2$ (i.e. the peak position at which the absolute value of the voltage is maximized), as shown in FIG. 13. More specifically, the point in time $(\pi/2)-\Delta$ from the zero-crossing point is chosen as the timing of turning on, and the point in time $(\pi/2)+\Delta$ is chosen as the timing of turning off. Controlling the timing of turning on/off in this manner reduces the magnitude of the phase shift between the AC voltage and the alternating current, and thereby prevents a decrease in the power factor during the dimming operation. In the examples shown in FIG. 13, the ON period becomes shorter (i.e. the effective voltage supplied to the lighting load becomes lower) as the waveform changes from (a) through (b) and (c) to (d). In example (e) in FIG. 13, the on/off switching is performed multiple times within one cycle of the voltage.

(6) Other Variations

The present invention is not limited to the previously described embodiment. For example, it can be modified as follows.

(6-1) Setting of Oscillation Frequency of Oscillator 13

In the previous embodiment, the oscillation frequency of the oscillator 13 was determined on the basis of the frequency of the zero-crossing signal measured by the frequency measurement section 12. Alternatively, it may be determined by measuring the frequency of the AC power source 2. It is also possible to allow users to manually set the frequency of the oscillator. If the AC power source to be used for the dimmer is previously specified, it is possible to use an oscillator whose frequency is fixed at a level equal to the fixed frequency of the power source or to an integral multiple of this fixed frequency.

(6-2) Zero-Crossing Detector Section

Figure 14:
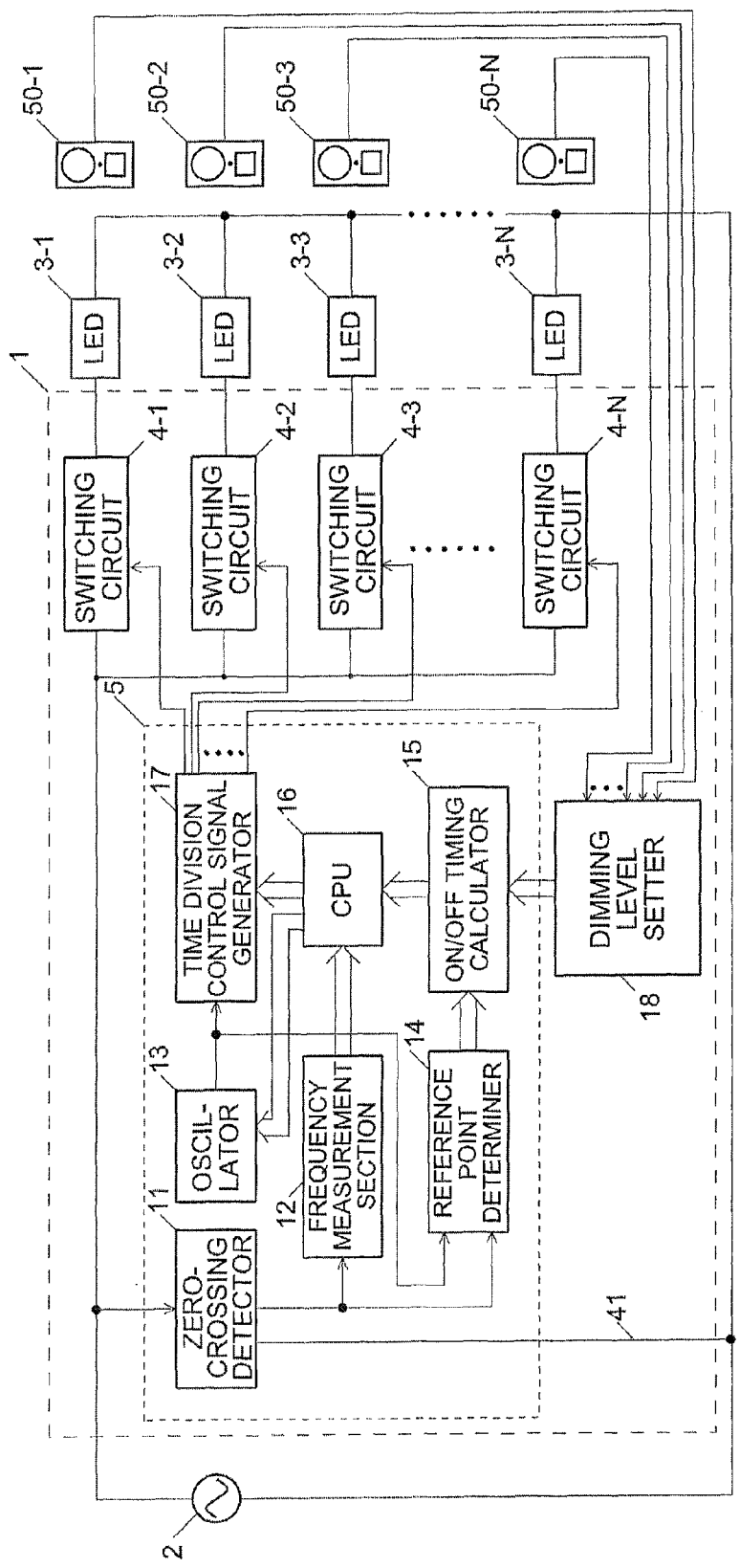
FIG. 14 is a block diagram showing a lighting circuit including a dimmer according to a variation of the present invention.

In the previous embodiment, the zero-crossing detector section 11 detects the zero-crossing point on the basis of the alternating current flowing between the AC power source 2 and the switching circuit 4. It is also possible, as shown in FIG. 14, to connect the zero-crossing detector section 11 to the line between the AC power source 2 and the lighting load 3 on the opposite side from the switching circuit 4 (as denoted by reference sign 41 in FIG. 14), so as to additionally measure the voltage of an alternating current flowing through this line and detect the zero-crossing point from the difference between the two voltages. By this method, the zero-crossing point can be detected in a stable manner even if the lighting circuit cannot be connected to a ground.

(6-3) Zero-Crossing Signal

The zero-crossing signal in the previous embodiment was rectangular waves having a value of $+V_c$ when the source voltage was positive and $-V_c$ when negative. Alternatively, a signal having a pulse-like form at the zero-crossing point may be used.

REFERENCE SIGNS LIST

1 . . . Dimmer
3 . . . Lighting Load
4 . . . Switching Circuit
5 . . . Time Division Control Circuit
6 . . . Switching Element
11 . . . Zero-Crossing Detector Section
111 . . . Zero-Crossing Detector Circuit
12 . . . Frequency Measurement Section
13 . . . Oscillator
14 . . . Reference Point Determiner Section
15 . . . On/Off Timing Calculator Section
16 . . . CPU
17 . . . Time Division Control Signal Generator Section
18 . . . Dimming Level Setter Section
21 . . . Noise
21A . . . Point in Time of Generation of Zero-Crossing Point, Displaced Due to Waveform Distortion
22 . . . Reference Point
22A . . . Correct Point in Time at Which Zero-Crossing Point Should Be Generated
23 . . . Zero-Crossing Point
24 . . . Point in Time at Which Polarity of Oscillating Signal Changes
25 . . . Zero-Crossing Signal
26 . . . Oscillating Signal
30 . . . Signal
31A, 31B, 31C . . . Error Component
32 . . . Peak
33A, 33B, 33C . . . Noise Peak
50 . . . Dimming Level Adjuster
51 . . . ON/OFF Switch
52 . . . Dimming Dial
53 . . . Indicator
55 . . . Light-Activating Position before Setting of Dimming Level in Diming Dial
56 . . . Light-Activating Position after Setting of Dimming Level in Diming Dial

The invention claimed is:

1. A dimmer for controlling an output of each of N sets of lighting loads (where N is an integer equal to or greater than two), comprising:
   a) a total of N switching circuits, with one switching circuit serially connected between an alternating-current (AC) power source and each of the N sets of lighting loads; and
   b) a single time division control circuit for separately controlling each effective voltage supplied to each of the N sets of lighting loads, by regulating a period of time to turn on each of the N switching circuits,
   the time division control circuit including:
      b-1) a single zero-crossing detector for detecting a zero-crossing point which is a point in time where a voltage of the AC power source becomes zero and for generating a zero-crossing signal whose value changes at the zero-crossing point;
      b-2) a single oscillator for generating an oscillating signal having a frequency equal to a frequency of the AC power source or to an integral multiple of the frequency of the AC power source;
      b-3) a single reference point determiner for measuring a phase difference between the zero-crossing signal and the oscillating signal every time the zero-crossing signal is generated, and for determining, based on data of measured values of the phase difference, a reference point to be used in setting a timing of turning on or off each switching circuit, the reference point being common to the N switching circuits; and
      b-4) a time division control signal generator provided for each of the N switching circuits, for transmitting, to the switching circuit, an on/off signal for turning on or off the switching circuit, at a timing determined based on the reference point and the effective voltage to be supplied to the lighting load.

2. The dimmer according to claim 1, comprising a frequency setter for measuring the frequency of the AC power source or the frequency of the zero-crossing signal and for setting the frequency of the oscillating signal in the oscillator based on the measured frequency.

3. The dimmer according to claim 1, wherein the reference point is determined on a basis of a moving average of the measured values of the phase difference.

4. The dimmer according to claim 3, wherein the moving average is an average of measured values that remains after largest and smallest values are excluded from four or more measured values.

5. The dimmer according to claim 1, wherein the reference point is determined by computing a finite impulse response to the measured values of the phase difference.

6. The dimmer according to claim 1, wherein the reference point is determined by computing a Fourier transform of a temporal change of the phase difference, removing a frequency component originating from noise, and computing an inverse Fourier transform.

7. The dimmer according to claim 1, wherein the reference point determiner determines, as the timing of turning on, a point in time that is a predetermined length of time earlier than a point in time that is out of phase with the reference point by $\pi/2$, and determines, as the timing of turning off, a point in time that is the same length of time later than the point in time that is out of phase with the reference point by $\pi/2$.

8. The dimmer according to claim 1, comprising:
a dimming level adjuster having an adjustment range between an upper limit and a lower limit for performing an operation of setting an emission intensity of each lighting load; and
a dimming level setter for setting a set value of the effective voltage for each lighting load based on the emission intensity set through the dimming level adjuster.

9. The dimmer according to claim 8, wherein the dimming level setter is constructed so as to set, as a light-activating effective voltage, a minimum effective voltage at which the lighting load begins to emit light, to relate the light-activating effective voltage to a predetermined light-activating position within the aforementioned adjustment range on the dimming level setter, and to assign, to a range between the light-activating position and a position corresponding to a highest level of the effective voltage to be supplied to the lighting load within the aforementioned adjustment range, values of the effective voltage between the light-activating effective voltage and the highest level of the effective voltage.

10. The dimmer according to claim 9, wherein the light-activating position is located at a position corresponding to a higher voltage than the lower limit of the adjustment range.

11. The dimmer according to claim 1, wherein the zero-crossing signal detector obtains the zero-crossing signal based on a voltage applied between two ends of two diodes in a zero-crossing detection circuit, where the two diodes are parallel-connected to the AC power source and have polarities oppositely directed to each other.

* * * * *